(12) United States Patent
Li et al.

(10) Patent No.: US 8,032,603 B2
(45) Date of Patent: Oct. 4, 2011

(54) METHODS FOR SENDING AN EMAIL AND DISTRIBUTING AN EMAIL AND AN EMAIL SERVER

(75) Inventors: Jane Li, Beijing (CN); Xue Zhe Liu, Beijing (CN); Zhi Lei Yang, Beijing (CN); Yan Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 12/412,597

(22) Filed: Mar. 27, 2009

(65) Prior Publication Data

US 2009/0248823 A1    Oct. 1, 2009

(51) Int. Cl.
*G06F 15/16* (2006.01)
(52) U.S. Cl. .................. 709/206; 709/205; 709/207
(58) Field of Classification Search ........... 709/204–207
See application file for complete search history.

(56) References Cited

U.S. PATENT DOCUMENTS

| | | | | |
|---|---|---|---|---|
| 5,508,817 A * | 4/1996 | Kunigami | ..................... | 358/402 |
| 5,978,837 A * | 11/1999 | Foladare et al. | .............. | 709/207 |
| 6,938,076 B2 * | 8/2005 | Meyer et al. | .................. | 709/219 |
| 7,076,241 B1 * | 7/2006 | Zondervan | ................. | 455/412.1 |
| 7,454,473 B2 * | 11/2008 | Suzuki | ........................ | 709/207 |
| 2003/0204568 A1 * | 10/2003 | Bhargava et al. | ............. | 709/206 |
| 2004/0198348 A1 * | 10/2004 | Gresham et al. | .............. | 455/431 |
| 2006/0224750 A1 * | 10/2006 | Davies et al. | ................. | 709/229 |
| 2007/0011258 A1 * | 1/2007 | Khoo | ........................ | 709/206 |
| 2008/0281922 A1 * | 11/2008 | Renshaw et al. | .............. | 709/206 |
| 2009/0228564 A1 * | 9/2009 | Hamburg | ..................... | 709/206 |
| 2009/0319584 A1 * | 12/2009 | Song | ........................... | 707/204 |

* cited by examiner

*Primary Examiner* — Faruk Hamza
(74) *Attorney, Agent, or Firm* — Steven M. Greenberg; Carey, Rodrigruez, Greenberg & Paul

(57) ABSTRACT

The present application relates to methods for sending an email and distributing an email, and an email server. According to the application, a summary is generated for an email to be sent, with the email stored in a sender side server; the summary of the email is sent to a receiver side server; and the email is sent to the receiver side server in response to receiving, by the sender side server, a request for sending the email, the request being sent by a recipient based on the summary. Thus, the network bandwidth, the storage space of the email server and user terminals may be saved.

4 Claims, 12 Drawing Sheets

FIG. 10

METHODS FOR SENDING AN EMAIL AND DISTRIBUTING AN EMAIL AND AN EMAIL SERVER

CROSS-REFERENCE TO RELATED APPLICATIONS

This application claims priority under 35 U.S.C. §119(a) to Chinese Patent Application Serial Number 200810089836.8, filed Mar. 28, 2008, entitled "METHODS FOR SENDING AN EMAIL AND DISTRIBUTING AN EMAIL AND AN EMAIL SERVER", the entirety of which is incorporated herein by reference.

DESCRIPTION

1. Technical Field

The present application generally related to an email system, and particularly to a method for sending an email, a method for distributing an email and an email server.

2. Technical Background

In a traditional email system, the email server just receives an email from one user, and forwards the email to another user. When involving broadcast of an email, the email server still receives the email from one user and send the email to multiple users. In this situation, it will cause extra data flow on the network if broadcasting the same large mail.

In the prior art, email sending schemes for reducing the network data flow are known, which mainly focus on email attachments. For example, in U.S. Pat. No. 7,054,905B1, entitled "Replacing an email attachment with an address specifying where the attachment is stored", there is disclosed replacing an email attachment with an address specifying where the attachment is stored. In such a solution, the attachment is stored in a file server, with URL indicating the attachment in the email.

In U.S. Pat. No. 7,113,948B2, entitled "Methods and Systems for Email Attachment Distribution and Management", there i+++s disclosed methods and systems for email attachment distribution and management, where the attachment is extracted into a database and send the email without the attachment to the recipient, so as to reduce the load of the email server.

In US Patent No. 2005/0193070A1, entitles "Providing a portion of an electronic mail message based upon a transfer rate, a message size, and a file format", there is disclosed a method for uploading downloading by each individual email user based upon a transfer rate, a message size, and a file format. The method includes determining whether it is desirable to provide less than all of an electronic mail message and determining a format associated with the electronic mail message in response to determining that it is desirable to provide less than all of the electronic mail message. The method also includes selecting a portion of the electronic mail message using the determined format and providing the selected portion of the electronic mail message.

In US Patent No. 2006/0277257A1, entitled "Minimizing data transfer from POP3 servers", there is disclosed systems and methods that facilitate minimizing data transfer from a post office protocol (POP) server to a client device by employing a date filter with a predefined date range and applying a message body size threshold above which only a message header will be downloaded to conserve bandwidth and memory space on the client device. A user can request download of a message for which only a message header was originally downloaded if the header comprises information of interest to the user.

SUMMARY OF THE INVENTION

The present application seeks to reduce the data flow on the network when broadcasting a large email.

To this end, the present application provides a method for sending an email, comprising steps of: generating a summary of an email to be sent, with the email stored in a sender side server; sending the summary of the email to a receiver side server; and sending the email to the receiver side server in response to receiving, by the sender side server, a request for sending the email, the request being sent by a recipient based on the summary.

The present application also provides a method for distributing an email to a user from an email server, comprising steps of: obtaining a summary of an email to be distributed, with the email stored in the email server; putting the summary of the email into an email box of the user; and distributing the email to the user in response to receiving, by the email server, a request for reading the email and sent by the user based on the summary.

The present application also provides an email server, comprising: an email filter adapted to filter an email according to predetermined criteria; a summary generator adapted to generate a summary of an email; a router handler adapted to call an email router to send the summary to receiver email boxes, or directly put the summary into the receiver email boxes; and a controller adapted to conduct control so that: for an email not complying with the criteria filtered out by the email filter, the router handler calls the email router to send the email directly to the receiver email boxes, or puts the email directly into the receiver email boxes; for an email complying with the criteria filtered out by the email filter, the summary generator generates a summary of the email, and the router handler calls the email router to send the summary to the receiver email boxes, or puts the summary directly into the receiver email boxes.

With above solutions, unnecessary data flow on the network may be reduced so that the bandwidth and the memory space may be conserved.

BRIEF DESCRIPTION OF THE DRAWINGS

The above and other objects, features and advantages of the present invention would be understood more easily by reading the following detailed description of the embodiments of the invention with reference to the accompanying drawings. Throughout the drawings, identical or corresponding technical features or components are designated by identical or similar reference signs, wherein:

FIGS. 10-13 are views showing examples of a user interface of an email user terminal according to one embodiment of the invention.

DETAILED DESCRIPTION OF EMBODIMENTS

The embodiments of the invention will be described below with reference to the accompanying drawings. It should be noted that for sake of clarity, those representations and descriptions of components and processes known to a skilled in the art and irrelevant to the gist of the invention are omitted here.

Figure 1:
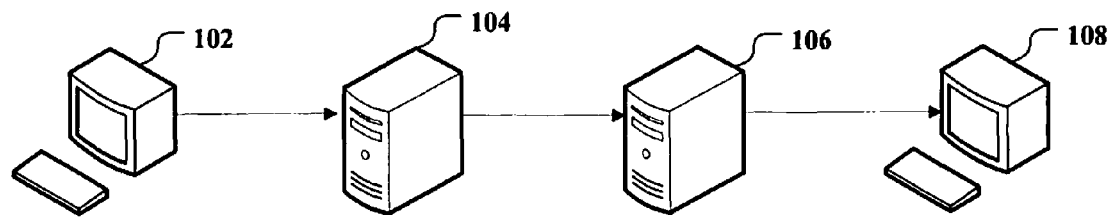
FIG. 1 is a schematic diagram of an example of an email system.

FIG. 1 shows an example of a basic configuration of an email system. As shown in FIG. 1, a first terminal 102 is communicably coupled to a first server 104 through an internal network (such as a LAN) or a public network (such as a public telephone network, via a modem). A second terminal 108 is communicably coupled to a second server 106 through an internal network (such as a LAN) or a public network (such as a public telephone network, via a modem). The first server 104 and the second server 106 are communicably coupled with each other through a network such as the Internet. Here, the first terminal 102 and the first server 104 may serve as a sender side user terminal and a sender side email server, respectively; and the second terminal 108 and the second server 106 may serve as a receiver side user terminal and a receiver side email server, respectively. The roles of the user terminals and the servers may be exchanged, of course.

The first terminal 102, the first server 104, the second server 106 and the second terminal 108 may be information processing devices of the same type or different types, and they may be dedicated computing devices or general-purpose computing devices, in which appropriate operating system and application software (and/or firmware) are installed so that they may function as sender/receiver side terminal/server, respectively. It may be appreciated that when user terminals pertaining to the same server (for examples, the users in the same LAN) send emails to each other, the emails pass through only that server. That is, in such a situation, the first server (sender side server) and the second server (receiver side server) are merged into one.

In addition, although only one receiver side server and only one receiver side user terminal are illustrated in FIG. 1 for sake of conciseness, obviously a sender side terminal may send an email simultaneously to multiple receiver side servers, and may also send an email simultaneously to multiple users pertaining to one receiver side server.

Figure 2:
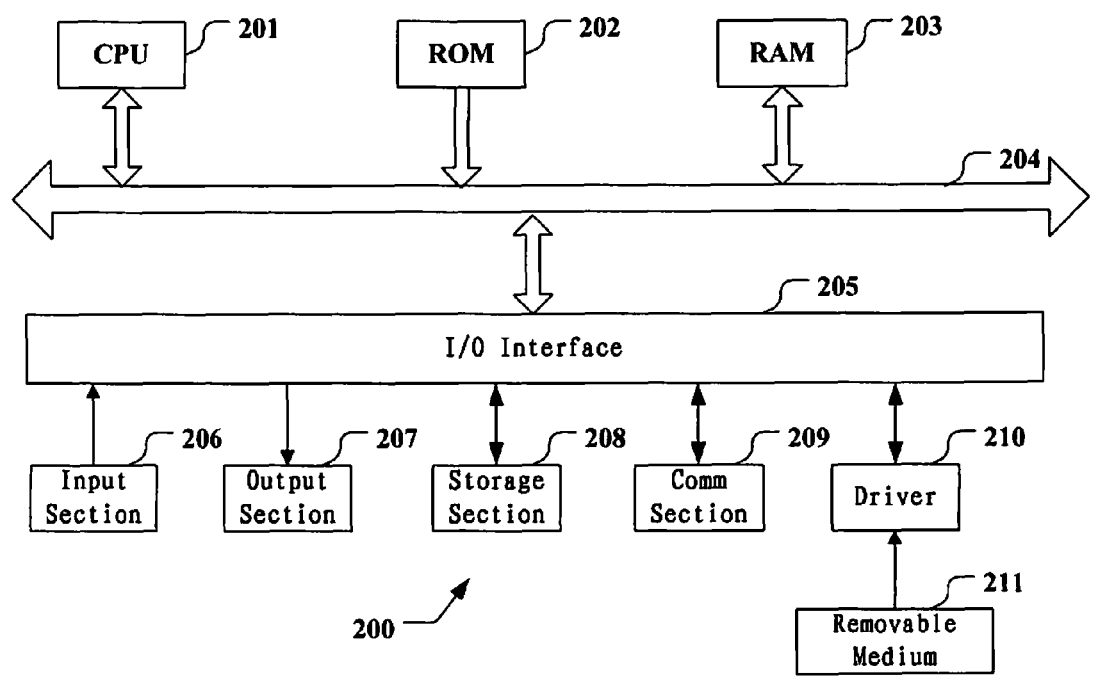
FIG. 2 is a structural diagram of an example of a computing device that may be used to realize the present invention.

FIG. 2 shows an exemplary configuration of a computing device 200 that may serve as a user terminal or a server.

In FIG. 2, a central processing unit (CPU) 201 performs various processes in accordance with a program stored in a read only memory (ROM) 202 or a program loaded from a storage section 208 to a random access memory (RAM) 203. In the RAM 203, data required when the CPU 201 performs the various processes or the like is also stored as required.

The CPU 201, the ROM 202 and the RAM 203 are connected to one another via a bus 204. An input/output interface 205 is also connected to the bus 204.

The following components are connected to input/output interface 205: an input section 206 including a keyboard, a mouse, or the like; an output section 207 including a display such as a cathode ray tube (CRT), a liquid crystal display (LCD), or the like, and a loudspeaker or the like; a storage section 208 including a hard disk or the like; and a communication section 209 including a network interface card such as a LAN card, a modem, or the like. The communication section 209 performs a communication process via the network such as the internet.

A drive 210 is also connected to the input/output interface 205 as required. A removable medium 211, such as a magnetic disk, an optical disk, a magneto-optical disk, a semiconductor memory, or the like, is mounted on the drive 210 as required, so that a computer program read there from is installed into the storage section 208 as required.

Applications may be installed into the computing device from the network such as the Internet or the storage medium such as the removable medium 211.

One skilled in the art understands that, the storage medium is not limit to the removable medium 211 having the program stored therein as illustrated in FIG. 2, which is delivered separately from the device for providing the program to the user. Examples of the removable medium 211 include a magnetic disk (including a floppy disk (registered trademark)), an optical disk (including a compact disk-read only memory (CD-ROM) and a digital versatile disk (DVD)), a magneto-optical disk (including a mini-disk (MD) (registered trademark)), and a semiconductor memory. Alternatively, the storage medium may be a ROM 202, a hard disk contained in the storage section 208, or the like, which have the program stored therein and is delivered to the user together with the device that containing them.

As mentioned in the technical background, when broadcasting a large email, extra data flow will occur on the network (including the network coupling the servers, and the network coupling the receiver side server and the receiver side user terminal), and the large email will consume the storage space of the receiver side server or the receiver side user terminal.

Therefore, the applicant proposes to send only the summary of the email to conserve the network bandwidth and the storage space of the users.

Figure 3:
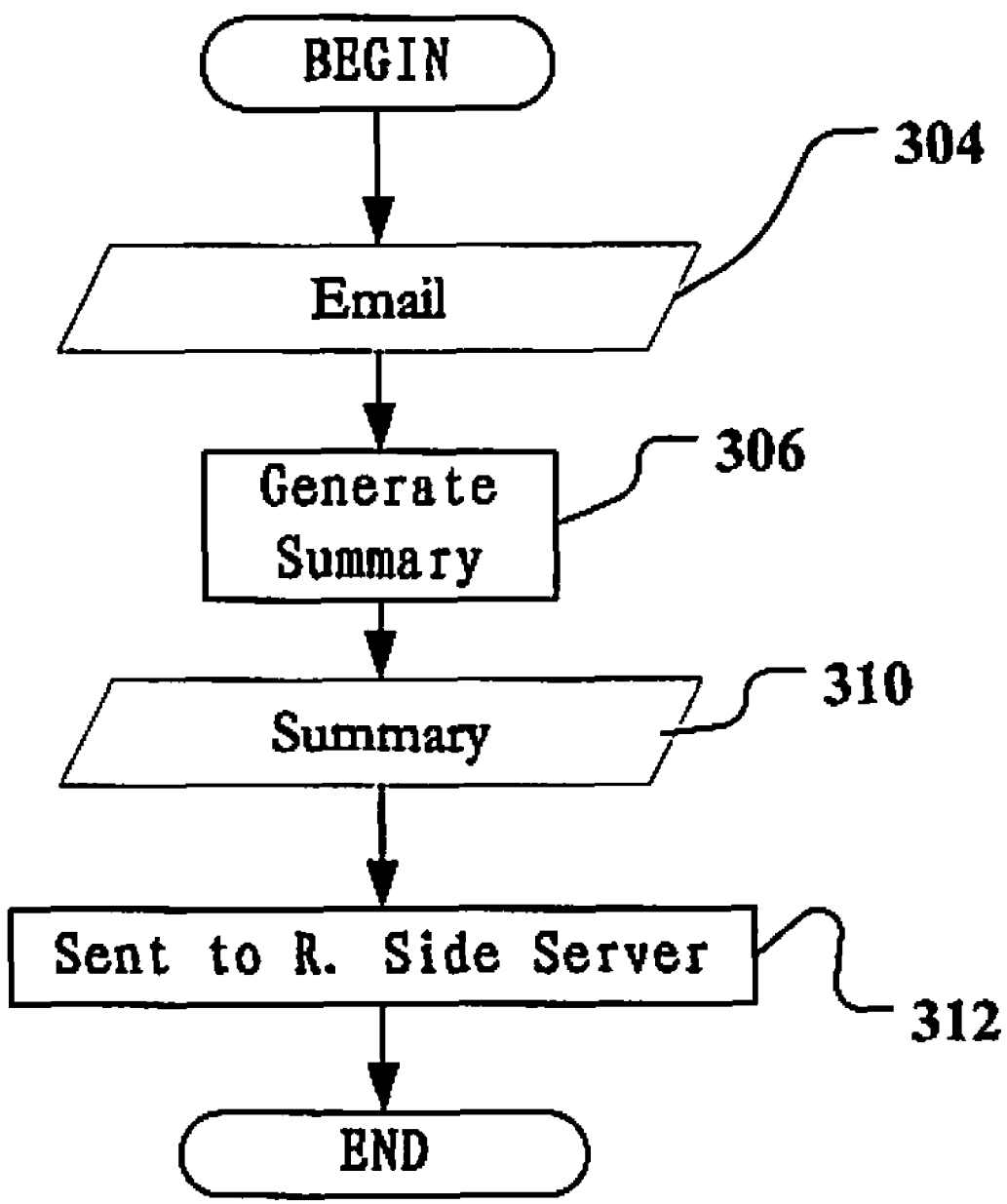
FIG. 3 is a flowchart of an embodiment of the method according to the invention.

As shown in FIG. 3, according to a method for sending an email according to a first embodiment of the invention, a summary is firstly generated based on the email 304 (Step 306). Then, only the generated summary 310 is sent to the receiver side server (Step 312).

Here, the step of generating the summary of the email may be realized based on any techniques available in the present or in the future. For example, as the summary of the email, an abstract of the text of the email and/or the attachment thereof may be extracted with the techniques for automatically generating an abstract. As the techniques for automatically generating an abstract, any techniques available in the present or in the future may be used. As an example, in U.S. Pat. No. 6,205,456B1, entitled "Summarization Apparatus and Method", there is disclosed an apparatus and a method for generating a summary (abstract). Another example, U.S. Pat. No. 5,708,825 entitled "Automatic summary page creation and hyperlink generation" also disclosed a scheme for generating an abstract automatically.

A further example, if the body of the email or the attachment of the email contains a picture or a video clipping, then the summary may contain a thumbnail of the picture and/or a thumbnail of a scene selected from the video clipping. Again an example, a reduced preview of the body of the email and/or the attachment of the email may be used as the summary. The above examples are only for illustrative purpose and are not intended to limit the invention. In a word, the object of generating the summary is to reduce the bandwidth and storage space consumed by the summary, while the summary suffices to make the recipient to know the basic content of the email.

According to the embodiment mentioned above, for those recipients not so interested in the content of an email, or for those recipients only needing to roughly knowing the content of the email, it suffices to receive the summary. Therefore, the network bandwidth and the storage space of the recipients may be conserved by only sending the summary.

Figure 4:
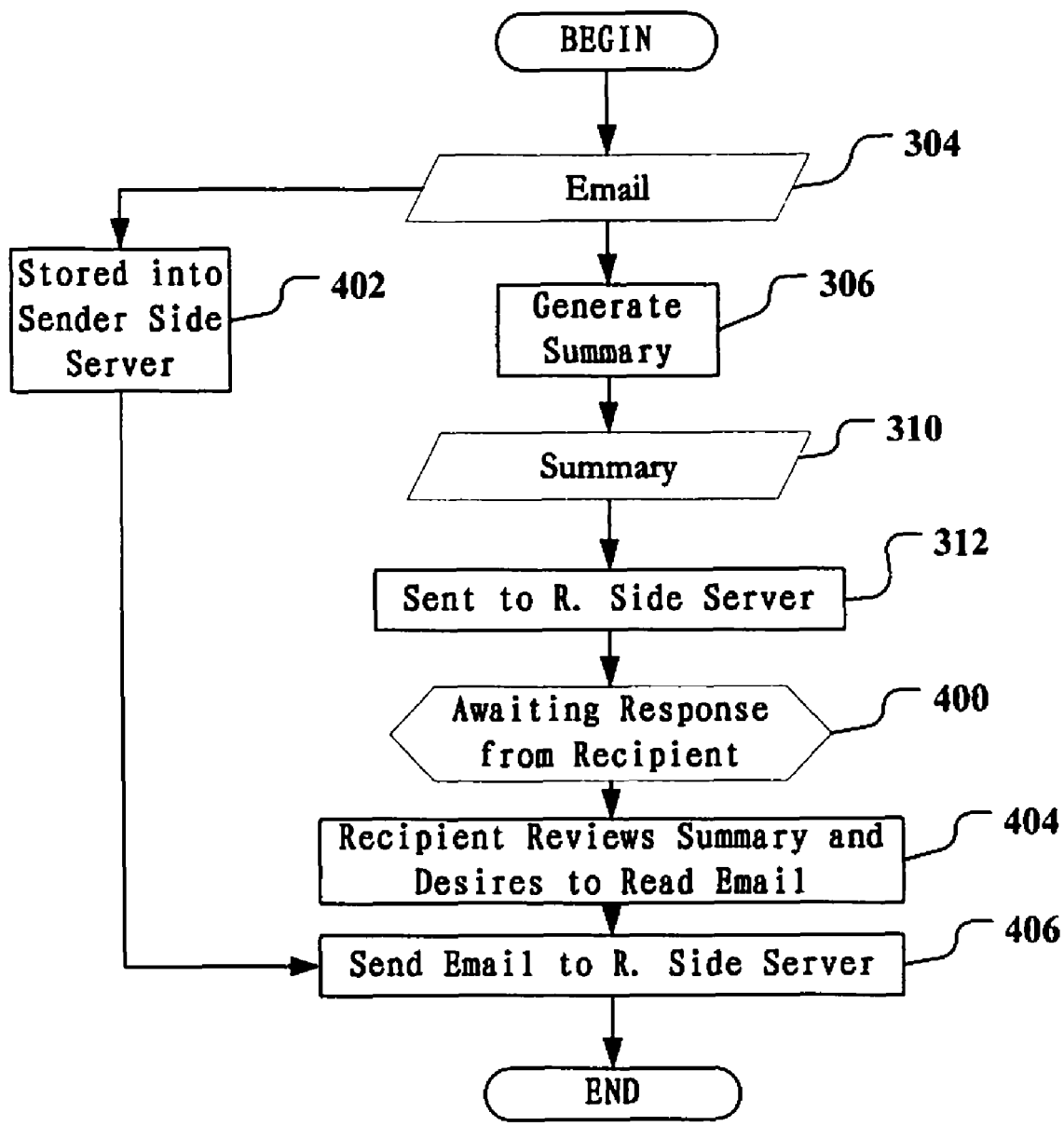
FIG. 4 is a flowchart of another embodiment of the method according to the invention.

In another embodiment of the invention, as shown in FIG. 4, all the steps up to the step 312 for sending the summary are the same as those shown in FIG. 3. However, in the embodiment shown in FIG. 4, the entire email is stored in the sender side server (Step 402), and the sender side server waits for the response from the receiver side (Step 400) and send the entire email to the receiver side server based on the message sent from a recipient having reviewed the summary and indicating the recipient's desire for reading the entire email (the message may be regarded as a request for sending the entire email and sent by the recipient based on the summary) (Step 406). Thus, the entire email is still available to those recipients desiring to read the entire email; while for those recipients not desiring to read the entire email, the network bandwidth and the storage space of the recipient may be saved.

Figure 5:
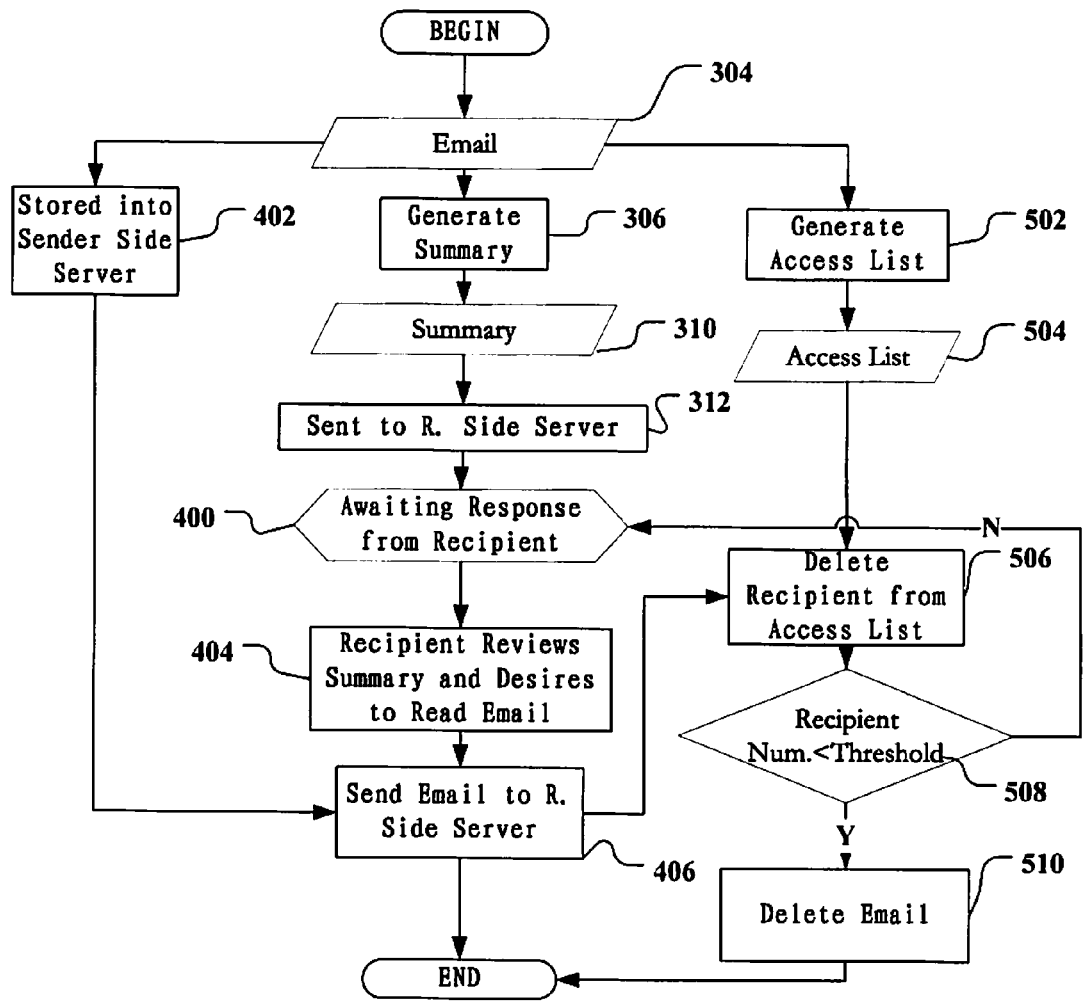
FIG. 5 is a flowchart of another embodiment of the method according to the invention.

According to the above mentioned solution, the entire email is stored in the sender side server. If the email is large in size, it will consume a large storage space of the sender side server for a long time. Therefore, another embodiment as shown in FIG. 5 is provided on the basis of the previous embodiment of the invention. The left half of FIG. 5 is the same as FIG. 4 and thus the detailed description thereof is omitted. According to the embodiment, an access list (504) is generated based on the recipient information in the email (Step 502). The access list (504) contains the address of every recipient in the email, and the sender side server accepts a request for sending the email only when the request is sent from a recipient in the access list based on the summary. Thus, in response to receiving, by the sender side server, a request for sending the email and sent by a recipient based on the summary, the email is sent to the receiver side server and the recipient is deleted from the access list (Step 506). Here it should be noted that the step 406 for sending the entire email and the step 506 for deleting the recipient from the access list may occur simultaneously or one after the other, whichever step may occur first. If the number of recipients in the access list becomes smaller than a predetermined threshold ("YES" in the determining step 508), then the entire email is deleted from the sender side server (Step 510) so that the space in the sender side server may be released timely. If the number of recipients are not smaller than the predetermined threshold ("NO" in the determining step 508), then the sender side server waits for the next request from the recipients (Step 400). Said predetermined threshold may be set on the basis of the strategy on the sender side and/or the size of the storage space of the sender side server, and may be any number lower than the number of recipients, even 1 (that is, the email is deleted when the number of recipients becomes to zero).

For releasing the storage space of the sender side server more timely, the access list 506 may be maintained more finely. For example, if a recipient deletes the summary directly after he/she views the summary, it shows that the recipient is not interested in the content of the entire email. Therefore, in response to receiving, by the sender side server, a message indicating the deletion of the summary, the corresponding recipient is deleted from the access list. After the sender side server sends the entire email to the receiver side server, if the recipient saves the email after reading it, then the corresponding recipient is deleted from the access list. If the recipient reviews the summary but does not save the email, nor deletes the summary, then the recipient remains in the access list.

The maintenance of the access list is conducted not necessarily on a recipient-basis, but may be conducted on a domain-basis. That is, in some situations, all the recipients pertaining to the same domain may be regarded as one single recipient. In response to deleting the summary by one recipient, the one recipient is deleted from the access list. However, if one recipient requests to read the entire email and thus make the sender side server to send the email to the receiver side server, then all the recipients pertaining to the same domain as the one recipient (included) are deleted from the access list, whether or not the one recipient has saved the email. In such a situation, the entire email is stored in the receiver side server and a second access list may be generated containing all the recipients pertaining to the same domain as the one recipient (that is the domain of the receiver side server). Based on a request for reading the email and sent by a recipient in the second access list based on the summary, the receiver side server distributes the email to the recipient. If the recipient saves the email, then the recipient is deleted from the second access list; if the recipient does not save the email, then the recipient remains in the access list. In response to deleting, by the recipient, the summary, the recipient is deleted from the second access list When the access list in the sender side server is maintained on a domain-basis, whether the email should be deleted from the sender side server may also be determined based on the number of domains in the access list. Alternatively, the number of domains and the number of recipients may be both considered. The specific threshold(s) may be set based on the resources and strategy of the sender side server.

The second access list may be maintained in a similar manner. In response to the number of recipients in the second access list becoming lower than a threshold, the email may be deleted from the receiver side server.

There is often such a situation in which a recipient takes no action against a received email (including the summary in the present invention, of course), probably resulting in that the email is stored in the sender side server and/or receiver side server for ever. For avoiding such a situation, it may be provided that if the time elapsed from the existence of the email in the sender side server or the receiver side server exceeds a threshold, then the email is deleted from the sender side server or the receiver side server, respectively.

In addition, for avoiding that the email is deleted before any recipient desiring to read the entire email has not read the entire email, a notification may be sent, before deleting the email from the server to the recipients in the access list, notifying that the email is to be deleted from the server, so that the recipients may read and save the email timely. Alternatively, the entire email may be sent directly to the recipients remained in the access list before it is deleted. Certainly, the recipients may be treated differently. For example, the entire email may be sent to those recipients having not taken any action or having no response, while the notification may be sent to the other recipients.

The main purpose of the present invention is to conserve the network bandwidth and the storage space of the server. If the email is not large in size and/or if there are not so many recipients, then it is unnecessary to generate the summary and the email may be sent directly. Therefore, according to another embodiment of the present invention, a step of filtering the email may be added before the solutions as shown in FIGS. 3, 4 and 5. For example, if the size of the email exceeds a predetermined threshold, then a summary of the email is generated and sent (and the email may be stored, an access list may be generated); if the size of the email does not exceeds the threshold, then the email itself is sent directly. The determining criteria may also be the number of recipients, or the number of domains, or any combination of the email size, recipient number and domain number.

The solutions described above are directed to such a scenario where the email is sent from one sender side server to multiple receiver side server, whether or not the recipients pertain to the same domain (that is, the same email server, or the recipients may be regarded as pertaining to the same email server).

In fact, just as mentioned in above solutions, if multiple recipients pertain to the same domain, then it is possible to store one single copy of the email in the receiver side server shared by the multiple recipients, not store multiple copies of the email in the email boxes of the multiple recipients. Similarly, only the summary of the email is distributed to every recipient, and an access list may also be created and maintained.

In addition, when one user sends an email to the other users in the same domain, the sender side server and the receiver side server are the same server. Again, it is possible to store only one single copy of the email in the server and generate a summary of the email to be sent to the recipient. An access list may also be created and maintained.

The scenario where an email is distributed from the receiver side server to the users will now be described in details with reference to accompanying drawings. Since the solutions below correspond to those solutions described with reference to FIGS. 3 to 5, corresponding reference signs with a prime. In addition, those descriptions similar to the solutions above are also omitted.

Figure 6:
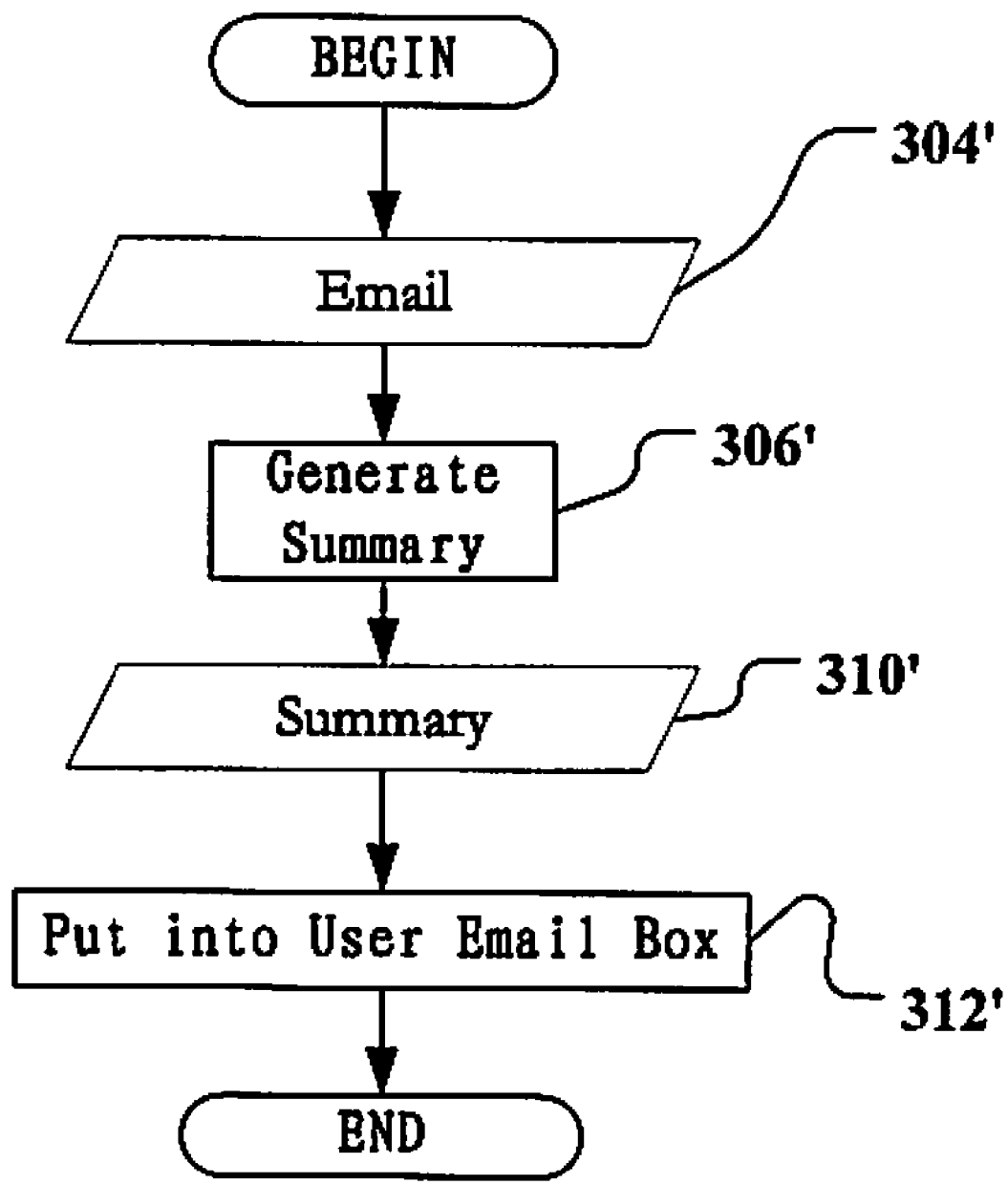
FIG. 6 is a flowchart of another embodiment of the method according to the invention.

As shown in FIG. 6, according to a method for distributing an email from an email server to users according to an embodiment of the invention, a summary is firstly generated based on the email 304' (Step 306'). Then, only the generated summary 310' is put into the users' email boxes (Step 312').

Figure 7:
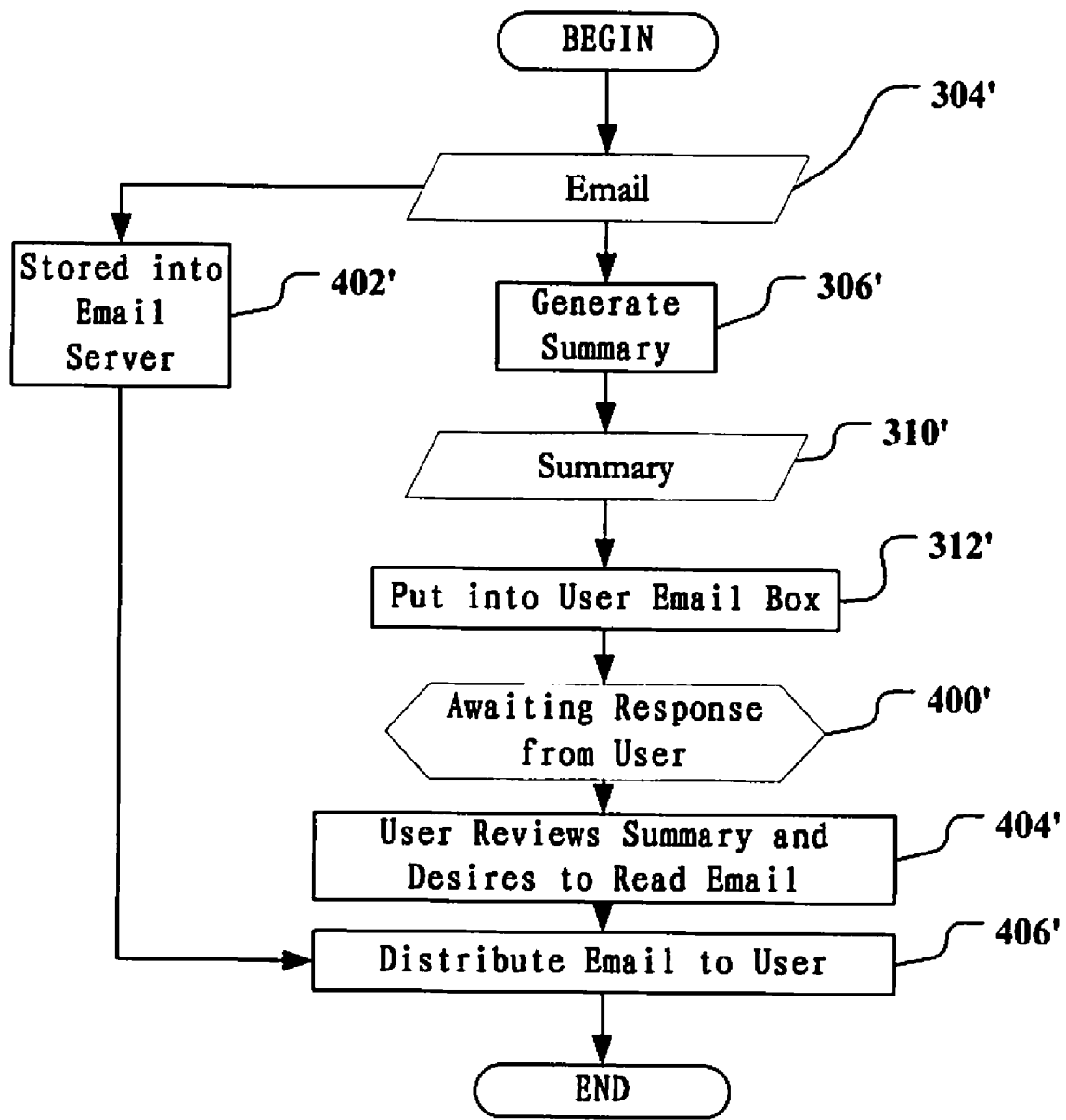
FIG. 7 is a flowchart of another embodiment of the method according to the invention.

In another embodiment of the invention, as shown in FIG. 7, all the steps up to the step 312' for putting the summary into user email boxes are the same as those shown in FIG. 6. However, in the embodiment shown in FIG. 7, the entire email is stored in the server (Step 402'), and the server waits for the response from the users (Step 400') and distribute the entire email to a user (Step 406') based on the message sent from the user having reviewed the summary and indicating the user's desire for reading the entire email (the message may be regarded as a request for distributing the email and sent by the user based on the summary) (Step 404'). Thus, the entire email is still available to those users desiring to read the entire email; while for those users not desiring to read the entire email, the network bandwidth (the bandwidth of the network connection between the server and the user terminals) and the storage space of the users, or the storage space of the user email boxes on the server, may be saved. Here, "distributing" means making, based on instructions of a user, the content of the email to be perceivable on the user terminal, comprises definitely the process of transferring a part of or the entire email to the user terminal via the network, with the email not necessarily stored in the user terminal in a user-accessible manner after the user quits reviewing.

Figure 8:
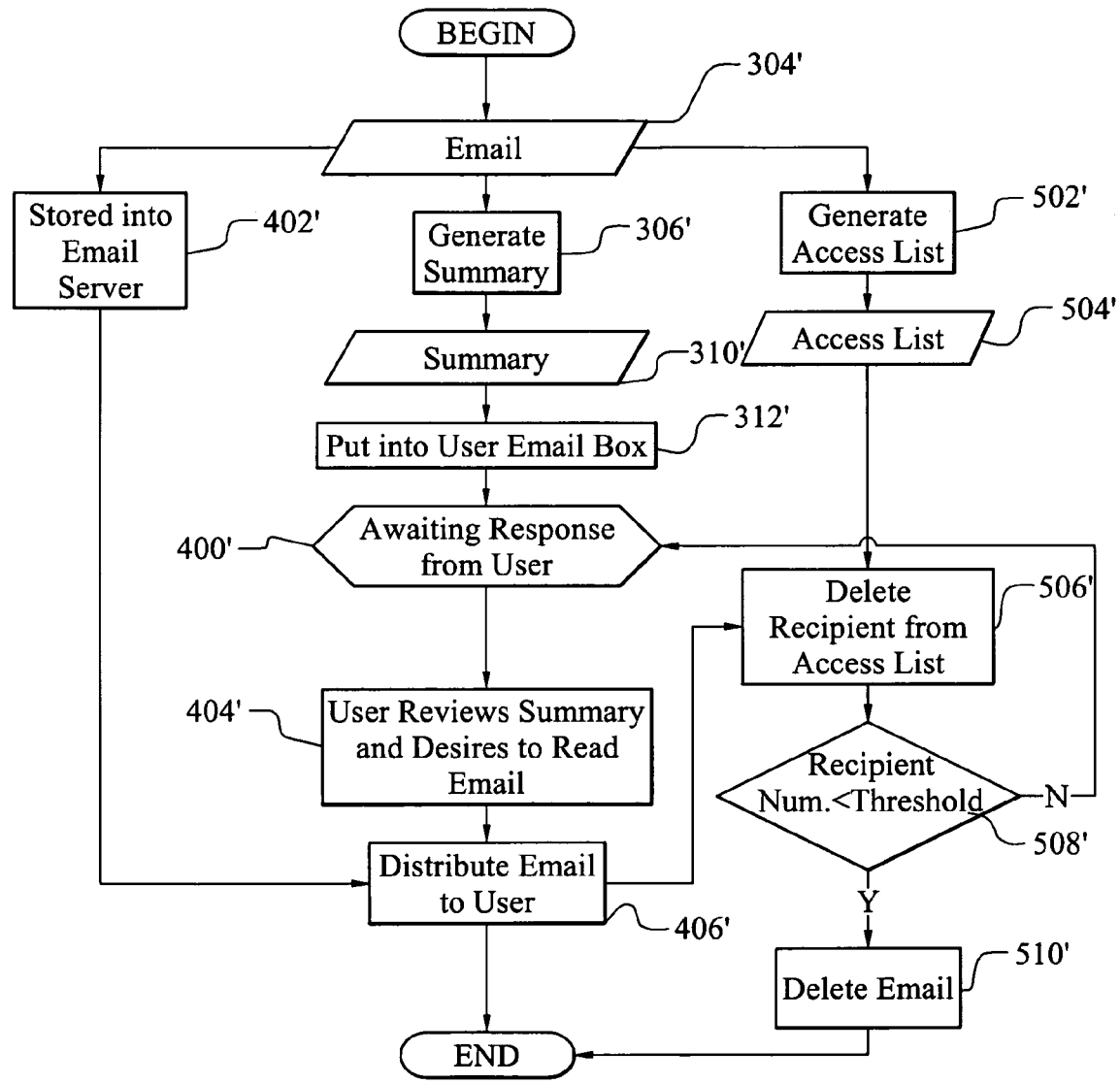
FIG. 8 is a flowchart of another embodiment of the method according to the invention.

In another embodiment, as shown in FIG. 8, an access list (504') is generated based on the recipient information in the email (Step 502'). The access list (504') contains the address of every recipient in the email, and the server accepts a request for distributing the email only when the request is sent by a user in the access list based on the summary. Thus, in response to receiving, by the server, a request for distributing the email and sent by a user based on the summary, the email is distributed to the user and the user is deleted from the access list (Step 506'). Here it should be noted that the step 406' for distributing the entire email and the step 506' for deleting the user from the access list may occur simultaneously or one after the other, whichever step may occur first. If the number of recipients in the access list becomes smaller than a predetermined threshold ("YES" in the determining step 508'), then the entire email is deleted from the server (Step 510') so that the space in the server may be released timely. If the number of recipients are not smaller than the predetermined threshold ("NO" in the determining step 508'), then the server waits for the next request from the recipients (Step 400'). Said predetermined threshold may be set on the basis of the strategy of the server and/or the size of the storage space of the server, and may be any number lower than the number of recipients, even 1 (that is, the email is deleted when the number of recipients becomes to zero).

Similarly, for releasing the storage space of the email server more timely, the access list 506' may be maintained more finely. For example, if a user deletes the summary directly after he/she views the summary, it shows that the user is not interested in the content of the entire email. Therefore, in response to receiving, by the server, a message indicating the deletion of the summary, the corresponding user is deleted from the access list. After the server distributes the entire email to the user, if the user saves the email after reading it, then the corresponding user is deleted from the access list. If the user reviews the summary but does not save the email, nor deletes the summary, then the user remains in the access list.

Also, it may be provided that if the time elapsed from the existence of the email in the server exceeds a threshold, then the email is deleted from the server. Also, a notification may be sent, before the email is deleted from the server, to the users in the access list, notifying that the email is to be deleted from the server, so that the users may read and save the email timely. Alternatively, the entire email may be sent directly to the users remained in the access list before it is deleted. Certainly, the users may be treated differently. For example, the entire email may be sent to those users having not taken any action or having no response, while the notification may be sent to the other users.

Similarly, a step of filtering the email may be added before the embodiments as shown in FIGS. 6, 7 and 8. For example, if the size of the email exceeds a predetermined threshold, then a summary of the email is generated and sent (and the email may be stored, an access list may be generated); if the size of the email does not exceeds the threshold, then the email itself is sent directly. The determining criteria may also be the number of recipients, or the number of domains, or any combination of the email size, user number and domain number.

In the above embodiments, since the manner of sending an email and distributing an email is different, a new method for receiving an email is provided correspondingly. According to embodiment of the method, the user email box or the user terminal only receives a summary of the email, according to which the user determines whether to read the entire email or directly delete the summary so as not to read the entire email, and thus conserve the network bandwidth and the storage space of the user email box or the user terminal.

When the entire email has been received, the user may further determine whether to save the email.

Various embodiments of the methods according to the invention have been described above. The present application also provides an apparatus realized based on software, firmware, hardware or any combination thereof to implement said various method. Specifically, the present application provides:

An apparatus for sending an email, comprising: means for generating a summary of an email to be sent; means for storing the email into a sender side server; means for sending the summary of the email to a receiver side server; and means for sending the email to the receiver side server in response to receiving, by the sender side server, a request for sending the email, the request being sent by a recipient based on the summary.

Said apparatus for sending the email may further comprise: means for generating an access list based on recipient information of the email, the access list containing the address of every recipient in the email, and the request for sending the email being accepted by the sender side server only when the request is sent by a recipient in the access list based on the summary.

Said apparatus for sending the email may further comprise: means for deleting the recipient from the access list if the recipient saves the email; means for remaining the recipient in the access list if the recipient does not save the email; and means for deleting the recipient from the access list in response to deleting, by the recipient, the summary.

Said apparatus for sending the email may further comprise: means for deleting the email from the sender side server in response to the number of recipients or domains in the access list becoming lower than a threshold; and/or means for deleting the email from the sender side server in response to the time elapsed from the existence of the email in the sender side server exceeding a threshold.

Said apparatus for sending the email may further comprise: means for, in response to receiving, by the sender side server, the request for sending the email and sent by a recipient based on the summary, deleting all the recipients in the same domain as the recipient from the access list after sending the email to the receiver side server; means for saving the email into the receiver side server; means for generating a second access list containing all the recipients in the same domain as the recipient; and, in the receiver side server, means for, based on a request for reading the email and sent by a recipient in the second access list based on the summary, distributing the email to the recipient; means for deleting the recipient from the second access list if the recipient saves the email; means for remaining the recipient in the access list if the recipient does not save the email; and means for deleting the recipient from the second access list in response to deleting, by the recipient, the summary.

Said apparatus for sending the email may further comprise: means for deleting the email from the receiver side server in response to the number of recipients in the second access list becoming lower than a threshold; and/or means for deleting the email from the receiver side server in response to the time elapsed from the existence of the email in the receiver side server exceeding a threshold.

Said apparatus for sending the email may further comprise: means for, before deleting the email from the sender side server or the receiver side server, notifying the recipients in the access list that the email is to be deleted from the server.

Said apparatus for sending the email may further comprise: means for determining whether to generate the summary of the email according to the size of the email and/or the number of recipients and/or the number of domains; and means for sending the email directly to the receiver side server if the result of the determining means is not to generate the summary of the email.

The present application also provides a method for distributing an email to a user from an email server, comprising: means for obtaining a summary of an email to be distributed, with the email stored in the email server; means for putting the summary of the email into an email box of the user; and means for distributing the email to the user in response to receiving, by the email server, a request for reading the email and sent by the user based on the summary.

Said apparatus for sending the email may further comprise: means for generating an access list based on recipient information of the email, the access list containing every recipient in the email, and the request for sending the email being accepted by the email server only when the request is sent by a user in the access list based on the summary; means for distributing the email to the user in response to receiving, by the email server, a request for reading the email and sent by a user based on the summary; means for deleting the user from the access list if the user saves the email; means for remaining the user in the access list if the user does not save the email; means for deleting the user from the access list in response to deleting, by the user, the summary; and means for deleting the email from the email server in response to the number of recipients in the access list becoming lower than a threshold.

Said apparatus for sending the email may further comprise: means for deleting the email from the email server in response to the time elapsed from the existence of the email in the email server exceeding a threshold.

Said apparatus for sending the email may further comprise: means for, before deleting the email from the email server, notifying the users in the access list that the email is to be deleted from the email server.

The means for obtaining the summary of the email to be distributed may comprise means for generating the summary of the email to be distributed.

Said apparatus for sending the email may further comprise: means for determining whether to generate the summary of the email according to the size of the email and/or the number of recipients; and means for distributing the email directly to the user if the result of the determining means is not to generate the summary of the email.

A skilled in the art may appreciate that the various components of the apparatus described above may be split, combined with each other or recombined after being split, so that the functions of respective modules and means and the interaction between modules and/or means are more reasonable.

Figure 9:
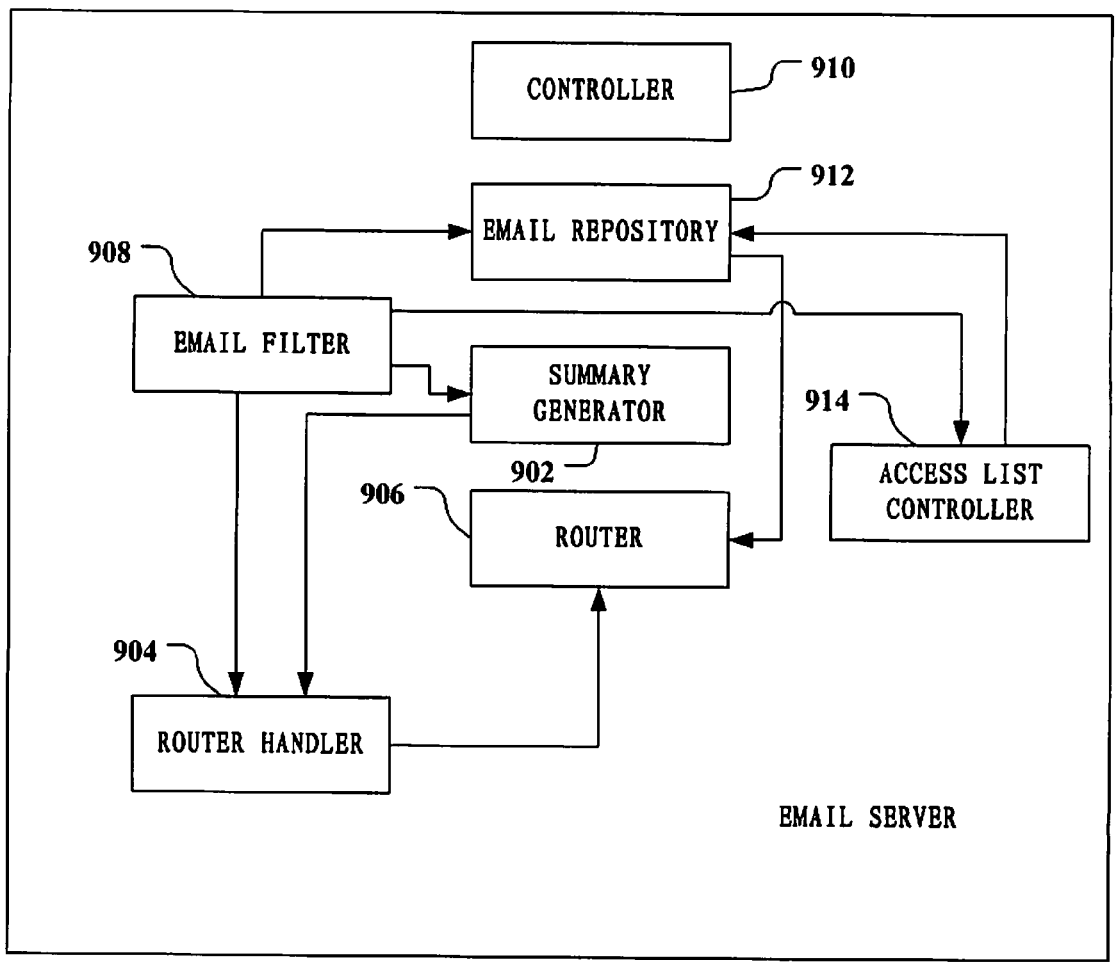
FIG. 9 is a structural diagram of an embodiment of an email server according to the invention.

FIG. 9 shows an embodiment of an email server. Note that from the description below of the email server, it could be known that not all the components shown in FIG. 9 are indispensable. However, for conciseness, FIG. 9 shows all the components involved in all the embodiments. In addition, it should be noted that FIG. 9 does not show those regular components (except for the router) shared by a conventional email server and the email server of the invention, the description of which is also omitted.

As shown in FIG. 9, according to one embodiment, the email server comprises a summary generator 902 and a router handler 904. Said summary generator 902 is adapted to generate a summary of an email. The generation of a summary has been described above and will not be repeated here. Said router handler 904 is adapted to call an email router 906 to send the summary to receiver email boxes. In a situation where the server of the receiver email box is the sender side server, the router handler 904 directly put the summary into the receiver email boxes without using the router 906.

According to another embodiment, said email server further comprises an email filter 908 and a controller 910. Said email filter 908 is adapted to filter an email according to predetermined criteria. Said criteria may be one or more of the size of the email, the number of recipients and the number of domains, which have been discussed above and omitted here. Said controller conducts control so that: for an email not complying with the criteria filtered out by the email filter 908, that is, for an email unnecessary to be summarized, the router handler 904 calls the email router 906 to send the email directly to the receiver email boxes; for an email complying with the criteria filtered out by the email filter 908, the summary generator 902 generates a summary of the email, and the router handler 904 calls the email router 906 to send the summary to the receiver email boxes. In both cases, if the server of the receiver email box is just the sender side server, then the router handler 904 puts the email or the summary directly into the receiver email boxes without using the email router 906.

According to another embodiment, said email server further comprises an email repository 912 adapted to store the email complying with the criteria filtered out by the email filter 908. Wherein, the router handler 904 is further configured to detect the requests from recipients. If a request for obtaining the entire email and sent by a recipient having read the summary is detected, then the router handler 904 calls the email router 906 to send the entire email stored in the email repository 902 to the receiver side email server. Alternatively, if the sender and the receiver use the same email server, then a link to the email stored in the email repository 902 is established.

According to another embodiment, said email server further comprises an access list controller 914 adapted to, with respect to the email complying with the criteria filtered out by the email filter 908, generate and maintain an access list based on the recipient information in the email, wherein, in response to the entire email being sent or distributed to the recipient who saves the entire email thereafter, the access list controller deletes the recipient from the access list; and if the recipient does not save the email, the access list controller remains the recipient in the access list; and, in response to the recipient deleting the summary, the access list controller deletes the recipient from the access list; Said access list controller 914 may be further configured to delete the email from the email repository 912 in response to the number of recipients and/or the number of domains in the access list. The access list controller 914 may also comprises a timer (not shown) for counting the time elapsed from the storage of the email in the email repository 912, and, in response to the time indicated by the timer exceeding a threshold, the access list controller 914 deletes the email from the email repository 912.

In the embodiments above, said email server may comprise multiple ports (not shown) for providing mirror images of the email stored in the email repository 912. A maximum accessing user number may be preset and if the number of recipients is larger than the maximum accessing user number, then mirror images of a large email may be provided on more than one port. Such a mechanism facilitates management of simultaneous accesses from a large number of users, and improves the accessing speed.

In the embodiments discussed above, the email server may serve as a sender side server, or as a receiver side server, or as both (that is, the sender and the receiver use the same server). If the sender side server and the receiver side server are not the same server, and the server according to the invention serves as the receiver side server, then there may be such a situation where the sender side server has already filtered the email sent to the receiver side server and generated the summary. For coping with such a situation, the controller 910 may be further configured to identify the summary of the email received from an other email server, and, in response to the entire email being requested for the first time to be read by a recipient, control the router handler 904 to request to receive the entire email from the other email server, and store the received entire email in the email repository 912, or put it directly into the receiver email boxes, and the access list controller 914 generates the access list according to the recipient information in the email.

For cooperating with the email server discussed above, it is necessary to provide a corresponding user terminal, which may be realized on any user terminal device (such as a computer, a PDA, or the like) with software, firmware, hardware or any combination thereof, or be realized in part on said email server with software, firmware, hardware or any combination thereof, to be accessed and invoked by the user terminal device, so as to constitute, together with the user terminal device, the user terminal according to the invention.

Specifically, the email user terminal according to one embodiment of the invention may comprise: summary receiving and displaying means adapted to receive and display the summary of the email; and requesting means adapted delete the summary or request to read the entire email in response to the user's operation on the summary of the email.

In another embodiment, said email user terminal may further comprise saving means adapted to save or not save the entire email in response to the user's operation on the entire email.

In another embodiment, said email user terminal may further comprise notifying means adapted to notify the email server of the deletion of the summary or the saving or not saving of the entire email.

Figure 10:
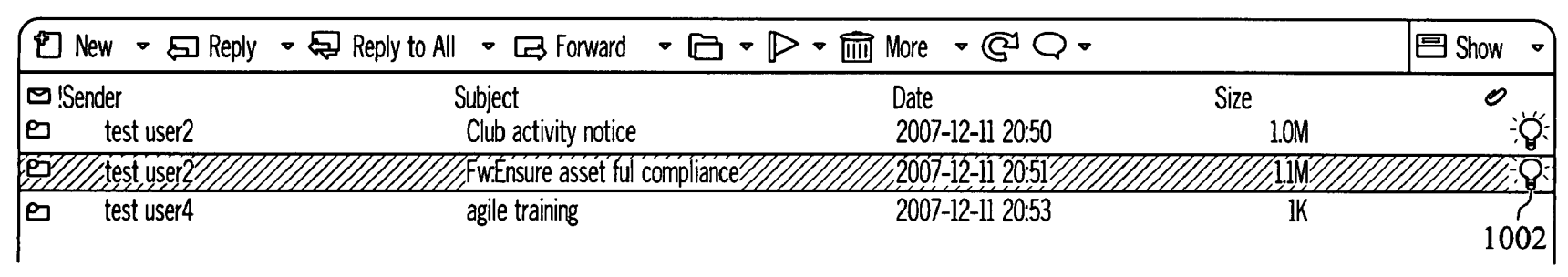
Figure 11:
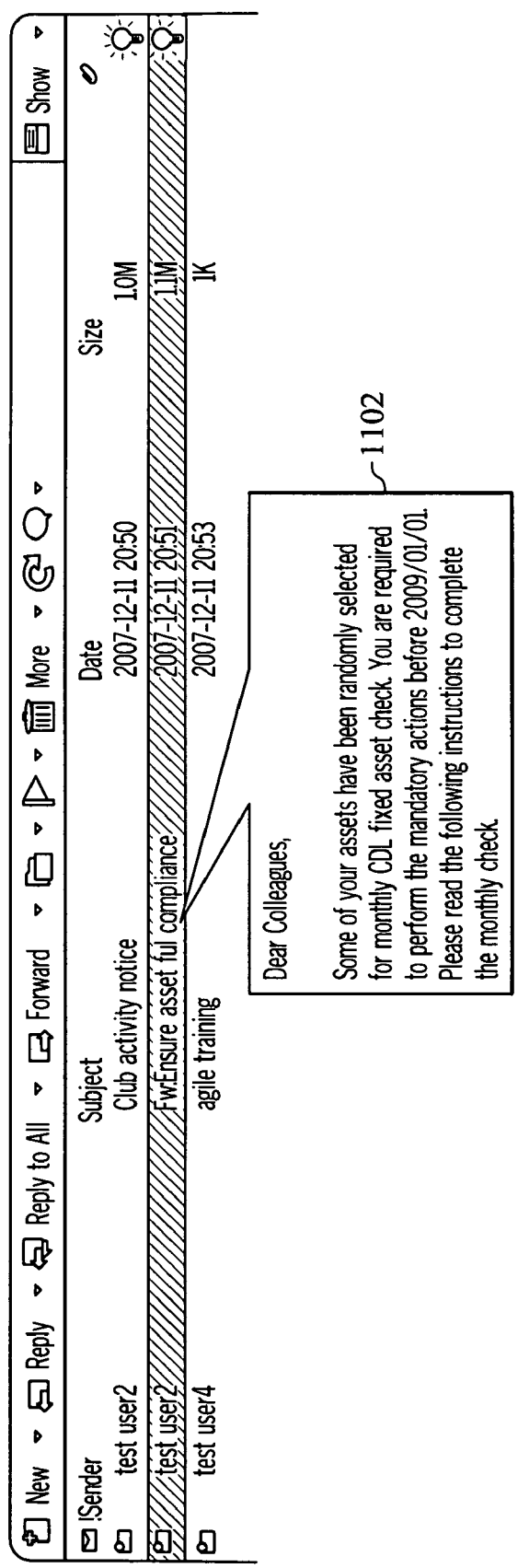

FIGS. 10-13 show examples of user interfaces on the email user terminal comprising various means as discussed above. As shown in FIG. 10, the means for receiving and displaying the summary of the email receives 3 emails, and displays the sender, the email subject and other information, and an indicator 1002 indicating whether the email is a summary or not. As shown in FIG. 11, in response to the cursor moving to the "summary" email, the contents of the summary are displayed in a balloon 1102. Apparently, the nature of the summary (whether or not the email is a summary email) and the display of the contents of the summary may be realized in any conceivable manner, which is not limited to the manner illustrated in FIG. 10 and FIG. 11.

Figure 12:
Figure 13:
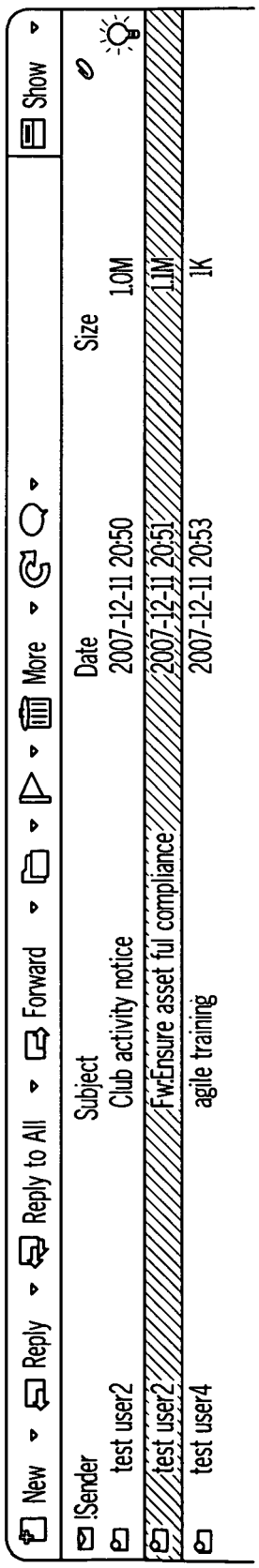

In the state as shown in FIG. 11, the user may choose to delete the summary email where the cursor rests, or open the summary email. The requesting means may delete the summary or request to read the entire email in response to the user's operation. The user's instruction "DELETE" or "OPEN" may be input through the menu on the user interface or the shortcut menu activated by the right click of the mouse. FIG. 12 shows en exemplary user interface on which the entire email is displayed after the user requests to read the entire email. In the state, the user may choose whether to save the entire email by means of the menu on the user interface or the shortcut menu of right click of the mouse. If the user chooses to not save the entire email, then the user interface may return to the state shown in FIG. 10; if the user chooses to save the entire email, then the user interface becomes the state shown in FIG. 13, wherein the indicator indicating "summary" disappears, meaning that the summary email already becomes the entire email.

As discussed above, for conserving the storage space in the server, the server should maintain the access list and the storage space, thus needing the feedback information from the user terminal. Therefore, in another embodiment, the email user terminal relies on the notifying means to notify the email server of the deletion of the summary or saving or not saving of the entire email.

Some embodiments of the invention have been described in details above. For a person skilled in the art, it could be understood that any or all of the steps/components of the method and apparatus according to the invention may be implemented in form of hardware, firmware, software of any combination thereof in any computing equipment (including a processor and storing media and etc.) or any network of computing equipments, and could be realized by the basic programming skills of any person skilled in the art having read the description of the invention, and more detailed description is omitted here.

Furthermore, in the above description, when concerning external operations possibly involved, it is obviously necessary to use a display device and a input device connected to a computing equipment, corresponding interfaces and controller software. In a word, relevant hardware and software in a computer, a computer system or a computer network, along with hardware, firmware or software implementing the operations in the method of the invention described above, or any combination thereof, constitute the apparatus of the invention and components thereof.

Therefore, based above understanding, the object of the invention may also be achieved by one application or one group of applications running on any information processing equipment, which may be well-known universal equipment. Therefore, the object of the invention may also be achieved by simply providing a program product comprising program codes capable of realizing the method or apparatus as described above. That is to say, such a program product constitutes the invention, and any storing media with such a program product stored therein also constitutes the invention. Obviously, said storing medium may be any well-known storing medium or any storing medium developed in the future, therefore it is unnecessary to list all the storing media here.

In the method and apparatus according to the invention, obviously, the component or steps may be decomposed, combined and/or re-combined after being decomposed. The decomposition and/or recombination shall be regarded as equivalents of the invention.

It should also be noted that the steps of the above-described series of processes may be performed chronologically in order of description, but not necessarily in such a chronological order. Some steps may be performed in parallel or independently of one another.

Although illustrative embodiments and their advantages have been described herein, it should be understood that various changes, replacements and modifications may be effected therein by a skilled in the art without departing from the scope or spirit of the invention as defined by the appended claims. Furthermore, the present application is not limited to the above-described specific embodiments for processes, devices, means, methods and steps. One skilled in the art will understand from the disclosure of the present invention that, according to the present invention, it is possible to use existing processes, devices, means, methods or steps and those to be developed in the future which perform substantially the same functions or obtain substantially the same results as the above-described embodiments. Therefore, the appended claims are intended to cover in their scopes such processes, devices, means, methods or steps.

The invention claimed is:

1. A method for distributing an email to a user from an email server, comprising steps of:
    generating a summary of an email to be distributed that is separate from the e-mail, the email being stored in a sender side server;
    putting the summary of the email into an email box of the user; and
    distributing the email to the user in response to receiving, by the email server, a request for reading the email sent by the user based on the summary,
    wherein generating the summary of the email to be distributed further comprises the steps of:
    determining whether to generate the summary of the email according to at least one of a number of recipients and a number of domains; and,
    distributing the email directly to the user if a result of the determining step is not to generate the summary of the email, mail but otherwise generating the summary of the email if the result of the determining step is generate the summary of the email.

2. The method of claim 1, further comprising the steps of:
    generating an access list based on recipient information of the email, the access list containing every recipient in the email; and,
    accepting the request for sending the email only when the request is sent by a user in the access list.

3. The method according to claim 1, further comprising deleting the email from the email server in response to a lapse of time of the email in the email server exceeding a threshold.

4. The method according to claim 3, further comprising, before deleting the email from the email server, notifying each recipient in the access list that the email is to be deleted from the email server.

* * * * *